(12) United States Patent
Nakajima

(10) Patent No.: US 8,224,069 B2
(45) Date of Patent: Jul. 17, 2012

(54) IMAGE PROCESSING APPARATUS, IMAGE MATCHING METHOD, AND COMPUTER-READABLE RECORDING MEDIUM

(75) Inventor: Mitsuyasu Nakajima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 280 days.

(21) Appl. No.: 12/685,102

(22) Filed: Jan. 11, 2010

(65) Prior Publication Data

US 2010/0182480 A1 Jul. 22, 2010

(30) Foreign Application Priority Data

Jan. 16, 2009 (JP) ................................ 2009-008010

(51) Int. Cl.
*G06K 9/00* (2006.01)
(52) U.S. Cl. ...................... 382/154; 382/209
(58) Field of Classification Search .................... 382/154
See application file for complete search history.

(56) References Cited

U.S. PATENT DOCUMENTS

| | | | |
|---|---|---|---|
| 6,490,369 B1 * | 12/2002 | Beiman .......................... | 382/153 |
| 6,636,634 B2 * | 10/2003 | Melikian et al. ............... | 382/217 |
| 6,807,304 B2 * | 10/2004 | Loce et al. ..................... | 382/209 |
| 7,835,568 B2 * | 11/2010 | Park et al. ..................... | 382/154 |
| 2002/0191831 A1 * | 12/2002 | Spoto et al. .................. | 382/141 |
| 2003/0161534 A1 * | 8/2003 | Loce et al. .................... | 382/209 |
| 2004/0071346 A1 * | 4/2004 | Clark et al. ................... | 382/209 |
| 2007/0183628 A1 * | 8/2007 | Carlson et al. ................ | 382/103 |

FOREIGN PATENT DOCUMENTS

| | | |
|---|---|---|
| JP | 07-282259 A | 10/1995 |
| JP | 09-231358 A | 9/1997 |
| JP | 10-021403 A | 1/1998 |
| JP | 11-039477 A | 2/1999 |
| JP | 2000-121319 A | 4/2000 |
| JP | 2001-109879 A | 4/2001 |
| JP | 2003-111080 A | 4/2003 |
| JP | 2003-308531 A | 10/2003 |
| JP | 2004-348303 A | 12/2004 |

OTHER PUBLICATIONS

Japanese Office Action mailed Nov. 16, 2010, and English translation thereof, issued in counterpart Japanese Application No. 2009-008010.

* cited by examiner

*Primary Examiner* — Sath V Perungavoor
(74) *Attorney, Agent, or Firm* — Holtz, Holtz, Goodman & Chick P.C.

(57) ABSTRACT

When a feature point extractor sets feature points on one of the images acquired by a first and second image acquirer, a template setting unit sets a base template containing a feature point onto an edge-extracted image of the acquired image. If the image within the base template is segmented by an edge, the template setting unit sets a transformed template, wherein a segmented sub-region that does not contain the feature point is deleted from the base template, and a region equal in area to the deleted region is added to the sub-region that does contain the feature point. A distance computing unit conducts template matching with respect to the one or more other images using either the base template or the transformed template, and computes the shooting distance to the matching feature point.

20 Claims, 14 Drawing Sheets

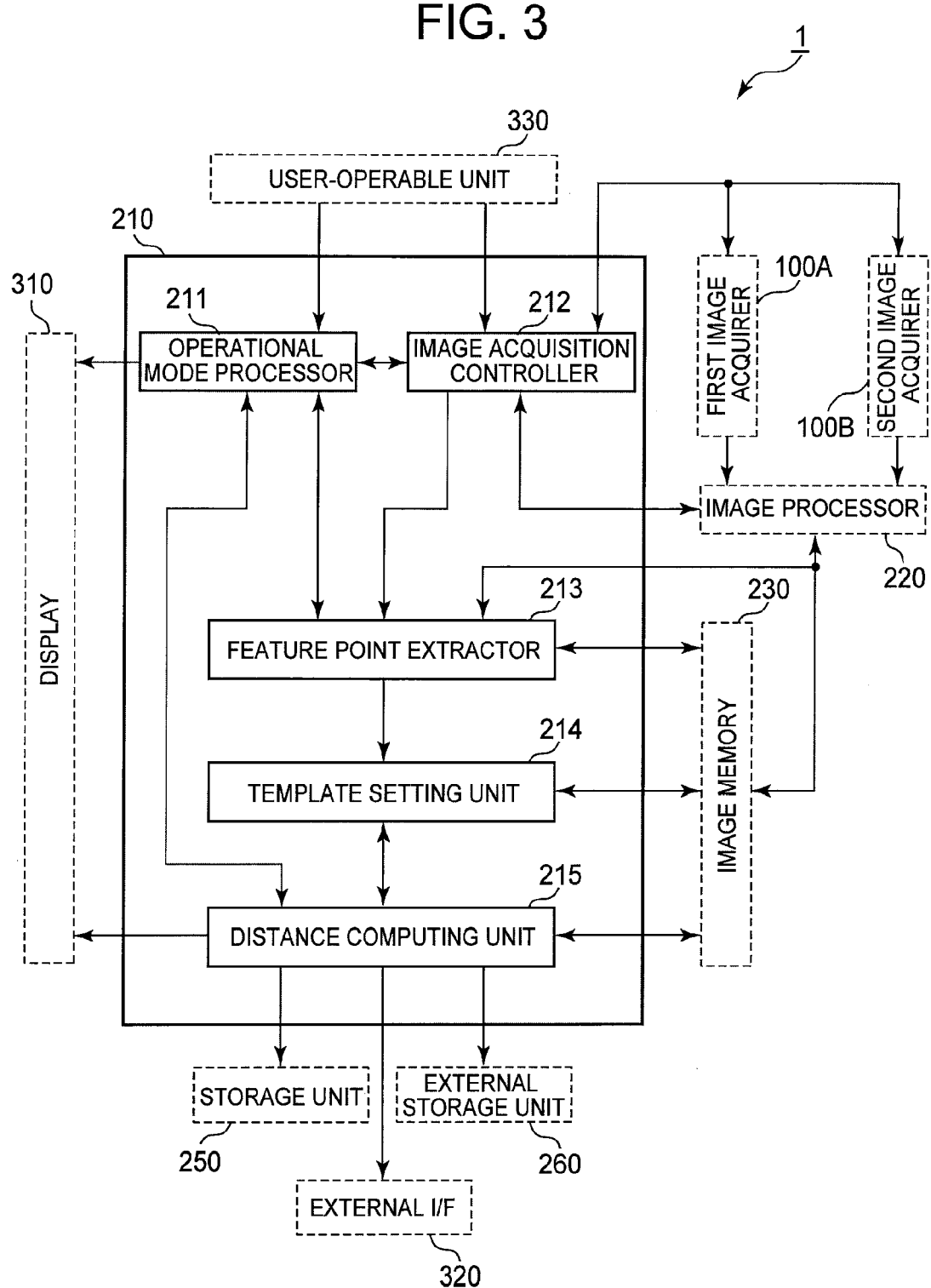

ACQUIRED IMAGE FROM LEFT CAMERA
(SECOND IMAGE ACQUIRER 100B)
= REFERENCE IMAGE (10B)

ACQUIRED IMAGE FROM RIGHT CAMERA
(FIRST IMAGE ACQUIRER 100A)
= OBJECT IMAGE (10A)

X FEATURE POINTS (1 TO m)

EXTRACTION OF FEATURE POINTS FROM OBJECT IMAGE

EDGE-EXTRACTED IMAGE (11A) OF OBJECT IMAGE $$X1 = u1 \times \frac{Z1}{f} \quad \text{-----} \quad (1)$$

$$b + X1 = u'1 \times \frac{Z1}{f} \quad \text{-----} \quad (2)$$

(1) AND (2) GIVE $$Z1 = b \times f \times \frac{1}{(u'1 - u1)} \quad \text{-----} \quad \text{EQ. 4}$$

IMAGE PROCESSING APPARATUS, IMAGE MATCHING METHOD, AND COMPUTER-READABLE RECORDING MEDIUM

CROSS-REFERENCE TO RELATED APPLICATION

This application claims the benefit of Japanese Patent Application No. 2009-8010 filed on Jan. 16, 2009, the disclosure of which is incorporated by reference herein.

FIELD

The present invention relates particularly to an image processing apparatus ideal for template matching, an image matching method, as well as a computer-readable recording medium storing a program for controlling an image processing apparatus.

BACKGROUND

A method is known whereby the triangulation principle is used to measure the distance to a subject from two or more acquired (i.e., shot) images with parallax.

In this case, in order to solve for the parallax, it is typical to conduct template matching among a plurality of images. Template matching solves for parallax by scanning the template region from one image over another image, and searching for the position with the minimum amount of discrepancy.

Herein, when the subject and the background are largely separated in an acquired image, then occlusion occurs near the subject boundary, such that the two or more images appear different. In such cases, there is a problem in that the distance computational accuracy significantly decreases near the sites where occlusion occurs.

In order to resolve such problems, a technique has been proposed wherein, after conducting ordinary template matching, template matching is conducted using a small-size template at sites where distance variation in the images is large.

By reducing the template size in cases where the region compared by matching contains edges or greatly varying distances, this technique makes it possible to resolve the effects occlusion. However, although the accuracy of position matching is improved when the template size used in template matching is small, there is a problem in that the accuracy of distance computation decreases.

For example, when 3D modeling is to be conducted using acquired images of real-life objects, accurate modeling cannot be conducted if the distance computational accuracy is low. Consequently, the establishment of a technique is desired whereby distance computation in acquired images can be conducted with higher accuracy.

SUMMARY

Being devised in light of the foregoing circumstances, the present invention provides an image processing apparatus and image matching method able to conduct distance computation with higher accuracy, as well as a computer-readable recording medium storing a program for controlling an image processing apparatus.

An image processing apparatus in accordance with a first aspect of the present invention conducts template matching among a plurality of images, and includes: image acquiring unit for acquiring two or more parallax images of the same subject; feature point setting unit for setting feature points in one of the images acquired by the image acquiring unit; template setting unit for setting a base template that includes a feature point set by the feature point setting unit; image determining unit for determining whether or not an image within the base template set by the template setting unit is segmented by an edge; transformed template setting unit for setting a transformed template in the case where it is determined that the image within the base template is segmented, wherein a segmented sub-region that does not contain the feature point is deleted from the base template, and a region equal in area to the deleted region is added to the sub-region that does contain the feature point; matching unit for conducting template matching with respect to the one or more other images, using at least the base template or the transformed template; and distance computing unit for computing the shooting distance to the feature point matched by the template matching conducted by the matching unit.

An image matching method in accordance with a second aspect of the present invention conducts template matching among a plurality of images by means of an image processing apparatus, and includes the steps of: (a) acquiring two or more parallax images of the same subject; (b) setting feature points in one of the images acquired in step (a); (c) setting a base template that includes a feature point set in step (b); (d) determining whether or not an image within the base template set in step (c) is segmented by an edge; (e) setting a transformed template in the case where it is determined that the image within the base template is segmented, wherein a segmented sub-region that does not contain the feature point is deleted from the base template, and a region equal in area to the deleted region is added to the sub-region that does contain the feature point; (f) matching by conducting template matching with respect to the one or more other images, using at least the base template or the transformed template; and (g) computing the shooting distance to the feature point matched by the template matching conducted in step (f).

A computer-readable recording medium in accordance with a third aspect of the present invention stores a program executed by a computer that controls an image processing apparatus conducting template matching among a plurality of images, wherein the program causes the computer to function as: image acquiring means for acquiring two or more parallax images of the same subject; feature point setting means for setting feature points in one of the images acquired by the image acquiring means; template setting means for setting a base template that includes a feature point set by the feature point setting means; image determining means for determining whether or not an image within the base template set by the template setting means is segmented by an edge; transformed template setting means for setting a transformed template in the case where it is determined that the image within the base template is segmented, wherein a segmented sub-region that does not contain the feature point is deleted from the base template, and a region equal in area to the deleted region is added to the sub-region that does contain the feature point; matching means for conducting template matching with respect to the one or more other images, using at least the base template or the transformed template; and distance computing means for computing the shooting distance to the feature point matched by the template matching conducted by the matching means.

BRIEF DESCRIPTION OF THE DRAWINGS

A more complete understanding of this application can be obtained when the following detailed description is considered in conjunction with the following drawings, in which:

FIG. 3 is a functional block diagram illustrating functions realized by the controller shown in FIG. 1;

DETAILED DESCRIPTION OF THE PREFERRED EMBODIMENT

An embodiment of the present invention will be hereinafter described with reference to the accompanying drawings. By way of example, the present invention is realized by means of a digital still camera (hereinafter, digital camera) in the present embodiment. The digital camera 1 in accordance with the present embodiment is taken to be provided with the functions included in a typical digital camera, but is also taken to be what is referred to as a compound eye camera provided with two image acquisition systems.

Figure 1:
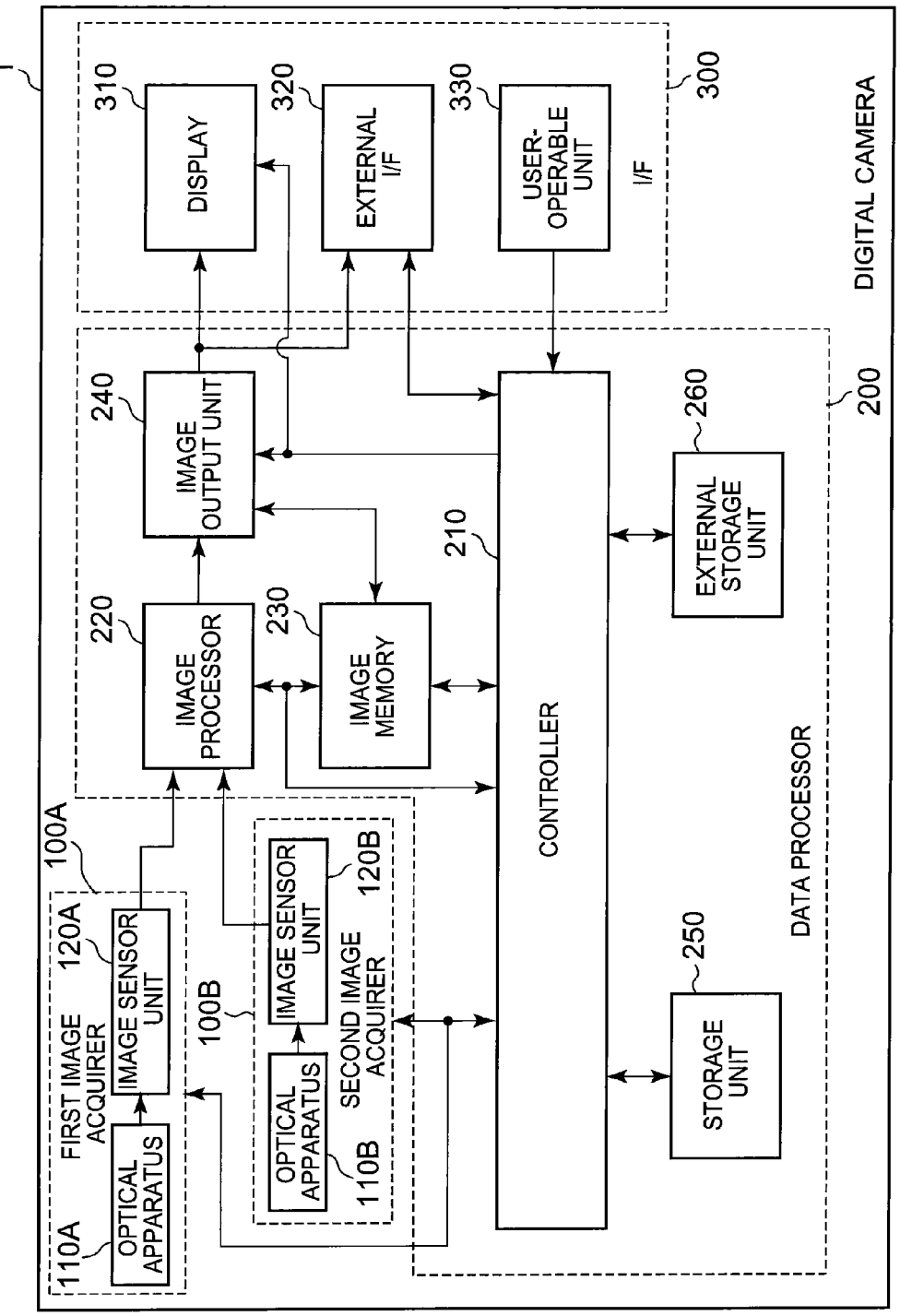
FIG. 1 is a block diagram illustrating the configuration of a digital camera in accordance with an embodiment of the present invention.

FIG. 1 is a block diagram illustrating the configuration of a digital camera 1 in accordance with an embodiment of the present invention. Schematically, the digital camera 1 in accordance with the present embodiment is provided with components such as a first image acquirer 100A, a second image acquirer 100B, a data processor 200, and an interface (I/F) 300, as shown in FIG. 1.

The first image acquirer 100A and the second image acquirer 100B are the portions of the digital camera 1 that conduct image acquisition. The first image acquirer 100A and the second image acquirer 100B are included because the digital camera 1 in accordance with the present embodiment is a compound eye camera as described above. However, the first image acquirer 100A and the second image acquirer 100B are identical in configuration. Hereinafter, "A" will be appended to the reference numbers of components belonging to the first image acquirer 100A, while "B" will be appended to the reference numbers of components belonging to the second image acquirer 100B.

As shown in FIG. 1, the first image acquirer 100A (second image acquirer 100B) includes components such as an optical apparatus 110A (110B) and an image sensor unit 120A (120B).

The optical apparatus 110A (110B) includes components such as one or more lenses, an aperture mechanism, and a shutter mechanism, and conducts optical operations related to image acquisition. In other words, the optical apparatus 110A (110B) operates so as to collect incident light and additionally adjust optical factors related to angle, focus, and exposure (such as the focal length, aperture, and shutter speed). The shutter mechanism included in the optical apparatus 110A (110B) is what is referred to as a mechanical shutter, and in the case where shutter operation is conducted solely by the operation of an image sensor, the shutter mechanism may be omitted from the optical apparatus 110A (110B). In addition, the optical apparatus 110A (110B) operates as a result of control by a controller 210, to be hereinafter described.

The image sensor unit 120A (120B) is made up of a charge-coupled device (CCD) or complementary metal-oxide-semiconductor (CMOS) image sensor, for example, and generates an electrical signal according to incident light collected by the optical apparatus 110A (110B). By performing photoelectric conversion, the image sensor unit 120A (120B) generates an electrical signal according to the intensity of incoming light, and the generated electrical signal is then output to the data processor 200.

As described above, the first image acquirer 100A and the second image acquirer 100B are identical. More specifically, all of the various specifications are identical, such as the lens focal length f and focal point F, the aperture range of the aperture mechanism, the image sensor size, as well as the number of pixels, arrangement, and area of pixels in the image sensor.

Figure 2A:
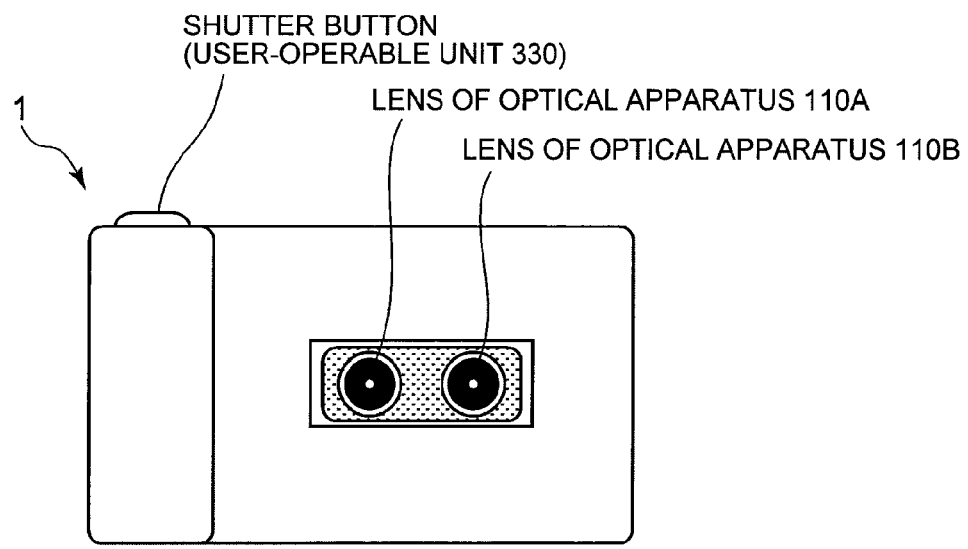
FIG. 2A illustrates the exterior configuration of a digital camera in accordance with an embodiment of the present invention.

As shown in FIG. 2A, the digital camera 1 having such a first image acquirer 100A and second image acquirer 100B is configured such that the lens of the optical apparatus 110A and the lens of the optical apparatus 110B are formed on the same face of the exterior of the digital camera 1. Herein, when the digital camera 1 is placed horizontally with the shutter button facing upwards, the two lenses (i.e., optical receivers)

are arranged such that their center positions lie on the same horizontal line. When the first image acquirer 100A and the second image acquirer 100B are made to operate simultaneously, two images of the same subject are acquired, but two acquired images are obtained with differing optical axis positions.

Figure 2B:
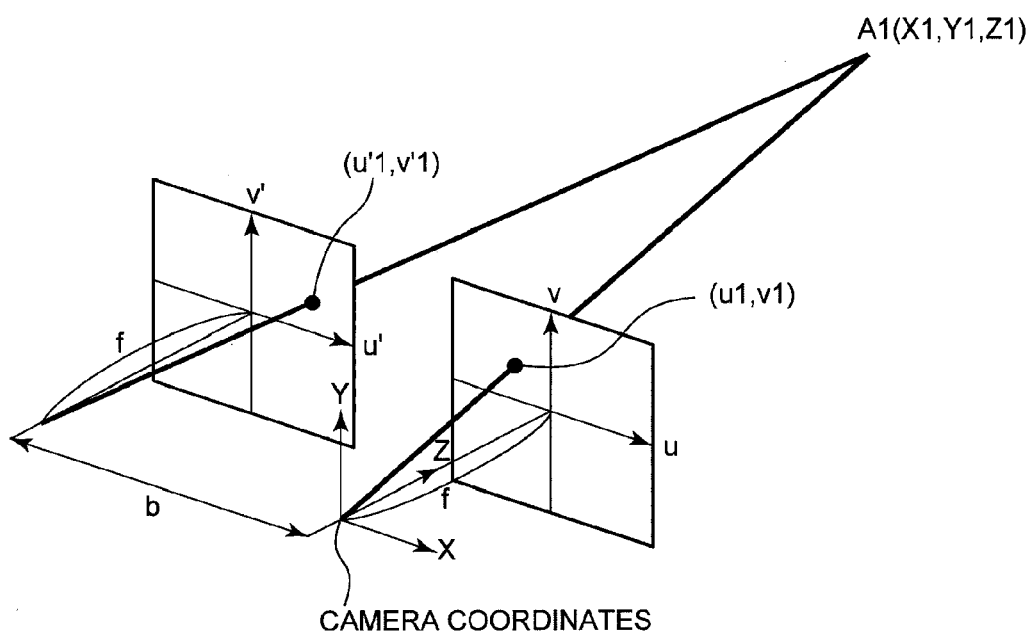
FIG. 2B illustrates the concept of parallel stereo in an embodiment of the present invention.

In this case, the first image acquirer 100A and the second image acquirer 100B are arranged so as to yield optical characteristics like those shown in the perspective projection model of FIG. 2B. The perspective projection model shown in FIG. 2B is based on a three-dimensional orthogonal coordinate system made up of X, Y, and Z. This coordinate system is hereinafter referred to as the camera coordinates, with respect to the first image acquirer 100A. In FIG. 2B, camera coordinates are shown originating at the optical center of the first image acquirer 100A.

In the camera coordinates, the Z axis is taken to be the direction matching the optical direction in the camera, while the X and Y axes are respectively parallel to the horizontal and vertical directions of the image. Herein, the point of intersection between the optical axis and the image coordinate plane is taken to be the origin (i.e., the optical center). When the pixel interval of the image sensor is converted and matched to units of length with the camera coordinates, the image coordinates indicating a subject A1 are taken to be (u1, v1) in the image coordinate plane of the first image acquirer 100A, and (u'1, v'1) in the image coordinate plane of the second image acquirer 100B.

The respective optical axes of the first image acquirer 100A and the second image acquirer 100B are parallel to each other (i.e., the angle of convergence is 0), and additionally, the image coordinates u axis of the first image acquirer 100A and the image coordinates it axis of the second image acquirer 100B are arranged in the same direction on the same line (i.e., the epipolar lines match). In addition, as described above, the focal length f and pixel interval are the same for the first image acquirer 100A and the second image acquirer 100B, and the optical axis and the axes of the image coordinate plane intersect orthogonally. Such a configuration is referred to as parallel stereo, and thus the first image acquirer 100A and the second image acquirer 100B of the digital camera 1 have a parallel stereo configuration.

Returning to FIG. 1, the description of the configuration of the digital camera 1 will now continue.

The data processor 200 processes the electrical signals generated as a result of the image acquisition operations by the first image acquirer 100A and the second image acquirer 100B, and generates digital data expressing the acquired images, while also conducting image processing with respect to the acquired images. As shown in FIG. 1, the data processor 200 includes components such as a controller 210, an image processor 220, image memory 230, an image output unit 240, a storage unit 250, and an external storage unit 260.

The controller 210 includes, for example, a CPU (Central Processing Unit) or similar processor and RAM (Random Access Memory) or similar primary storage device (memory). By executing a program stored in the storage unit 250 to be hereinafter described, the controller 210 controls the various components of the digital camera 1. In addition, in the present embodiment, by executing a predetermined program, the functions associated with the various processes to be hereinafter described are realized by the controller 210.

The image processor 220 includes, for example, an ADC (Analog-Digital Converter), buffer memory, and a processor for image processing (also referred to as an image processing engine). The image processor 220 generates digital data expressing the acquired images on the basis of the electrical signals generated by the image sensor units 120A and 120B.

In other words, an analog electrical signal output from the image sensor unit 120A (120B) is converted into a digital signal by the ADC and sequentially stored in the buffer memory. The image processing engine then "develops" the buffered digital data by adjusting image quality and compressing the data, for example.

The image memory 230 is made up of a storage device such as RAM or flash memory, for example, and temporarily stores acquired image data generated by the image processor 220, or image data processed by the controller 210.

The image output unit 240 is made up of an RGB signal generating circuit, for example. The image output unit 240 converts image data loaded into the image memory 230 into an RGB or similar signal, and then outputs the signal to a display screen (such as the display 310 to be hereinafter described).

The storage unit 250 is made up of a storage device such as ROM (Read-Only Memory) or flash memory, and stores information such as programs and data required for the operation of the digital camera 1. In the present embodiment, the storage unit 250 is taken to store information such as operational programs executed by the controller 210, as well as parameters and expressions required by processes.

The external storage unit 260 is made up of a storage device that can be inserted into and removed from the digital camera 1, such as a memory card, for example. The external storage unit 260 stores information such as image data acquired by the digital camera 1.

The interface 300 includes components that act as an interface between the digital camera 1 and its user or an external apparatus. As shown in FIG. 1, the interface 300 includes components such as a display 310, an external interface (I/F) 320, and a user-operable unit 330.

The display 310 is made up of a liquid crystal display device, for example, and outputs various screens required for operating the digital camera 1, live-view images during shooting, and acquired images for display, for example. In the present embodiment, the display 310 outputs acquired images or other information for display on the basis of an image signal from the image output unit 240 (i.e., an RGB signal).

The external I/F 320 is made up of a USB (Universal Serial Bus) connector or video output port, for example. The external I/F 320 outputs image data to an external computer, or outputs an acquired image for display on an external monitor.

The user-operable unit 330 is made up of various buttons or other elements disposed on the exterior of the digital camera 1. The user-operable unit 330 generates input signals according to operations made by the user of the digital camera 1, and then sends the input signals to the controller 210. The buttons constituting the user-operable unit 330 may include, for example, a shutter button for issuing a shutter operation command, a mode button for specifying one of the operational modes of the digital camera 1, as well as directional keys and function buttons for configuring various settings.

In the present embodiment, as a result of operational programs stored in the storage unit 250 being executed by the controller 210, the various processes hereinafter described are realized. Hereinafter, the functions realized by the controller 210 in this case will be described with reference to FIG. 3.

FIG. 3 is a functional block diagram illustrating functions realized by the controller 210. Herein, FIG. 3 illustrates the functional configuration necessary for realizing operation whereby images acquired by a compound eye camera are used to compute the shooting distance from the digital camera 1 to various portions captured in the images. In this case, the controller 210 functions as an operational mode processor 211, an image acquisition controller 212, a feature point extractor 213, a template setting unit 214, and a distance computing unit 215, as shown in FIG. 3.

The operational mode processor 211 cooperates with the display 310 to display screens necessary for causing the user of the digital camera 1 to specify each of the various operational modes available in the digital camera 1, and to display settings screens for each specified operational mode. In addition to the above, the operational mode processor 211 also cooperates with the user-operable unit 330 to recognize the operational mode specified by the user, read out the programs, expressions, or other information necessary for executing that operational mode, and then load that information into the primary storage device (memory) of the controller 210.

In the present embodiment, an operational mode for computing a shooting distance for each feature point on an acquired image acquired by the digital camera 1 is specified by the user (i.e., a distance computing mode is specified). Subsequently, the various functional components of the controller 210 to be hereinafter described are realized as a result of executing a program loaded by the operational mode processor 211 in accordance with the specified distance computing mode.

The image acquisition controller 212 executes image acquisition operation of the digital camera 1 by controlling the first image acquirer 100A and the second image acquirer 100B. The shooting distance computing function in accordance with the present embodiment computes the shooting distance from two parallax images obtained from a first image acquirer 100A and a second image acquirer 100B in a parallel stereo configuration. For this reason, the image acquisition controller 212 in accordance with the present embodiment controls the first image acquirer 100A and the second image acquirer 100B such that their image acquisition operations are conducted simultaneously. In so doing, two acquired images of the same subject but with differing optical axes are obtained.

The feature point extractor 213 extracts feature points from the acquired images obtained as a result of the control by the image acquisition controller 212. The feature point extractor 213 extracts feature points using the Harris corner detection algorithm, for example. In addition, by controlling the image processor 220, the feature point extractor 213 extracts edges from acquired images.

The template setting unit 214 sets the template to be used during template matching between the two acquired images obtained as described above. In the present embodiment, the template setting unit 214 sets a template containing the feature points extracted by the feature point extractor 213, while also changing the shape or size of the template when edges are contained in the set template.

The distance computing unit 215 conducts template matching between the two acquired images using the template set by the template setting unit 214, and thereby computes the shooting distance for each feature point. In the present embodiment, one of the two images obtained by image acquisition is taken to be the "object image" for final output, while the other is taken to be the "reference image" referenced during template matching. Hereinafter, the acquired image from the first image acquirer 100A is taken to be the object image, while the acquired image from the second image acquirer 100B is taken to be the reference image.

In this case, the feature point extractor 213 extracts feature points from the object image, while the template setting unit 214 sets a template onto the object image from which feature points were extracted. The distance computing unit 215 conducts template matching by scanning the template set onto the object image over the reference image, and then computes the shooting distance from the discrepancy (i.e., parallax) between the matched images by means of the triangulation principle. Herein, the distance computing unit 215 is taken to conducts template matching using the sum of squared differences (SSD), for example.

The distance computing unit 215 generates information expressing the computed shooting distance for each feature point (hereinafter referred to as distance information), and then outputs this information together with the object image. The output destination in this case may be the display 310, the storage unit 250, or the external storage unit 260, or alternatively, an external apparatus connected via the external I/F 320.

The above thus describes the functions realized by the controller 210. It should be appreciated that while in the present embodiment the various functions described above are realized as logical processes resulting from the controller 210 executing a program, these functions may also be realized in hardware, such as an ASIC (Application-Specific Integrated Circuit), for example. In this case, the functions related to image processing from among those shown in FIG. 3 may also be realized by the image processor 220.

The configuration of the digital camera 1 described above is the configuration required to realize the present invention, and configurations used for the basic functions or additional functions of an ordinary digital camera may also be provided as necessary.

Operation of the digital camera 1 having the above configuration will be hereinafter described. Among the operational modes of the digital camera 1 herein, the distance-at-shooting computing process executed by the digital camera 1 when the above-described distance computing mode is selected will be described with reference to the flowchart shown in FIG. 4. This distance-at-shooting computing process is initiated when the distance computing mode is selected as a result of the user of the digital camera 1 operating the user-operable unit 330. In this case, the operational mode processor 211 loads the programs or other information related to shooting distance computing operation from the storage unit 250, which causes the following processes to be executed by the various functional components shown in FIG. 3.

Once the process is initiated, the image acquisition controller 212 controls the first image acquirer 100A and the second image acquirer 100B in response to the shutter button (i.e., the user-operable unit 330) being operated, and causes the first image acquirer 100A and the second image acquirer 100B to simultaneously conduct image acquisition operations (i.e., simultaneous compound eye image acquisition) (step S101: Yes, step S102).

Figure 8A:
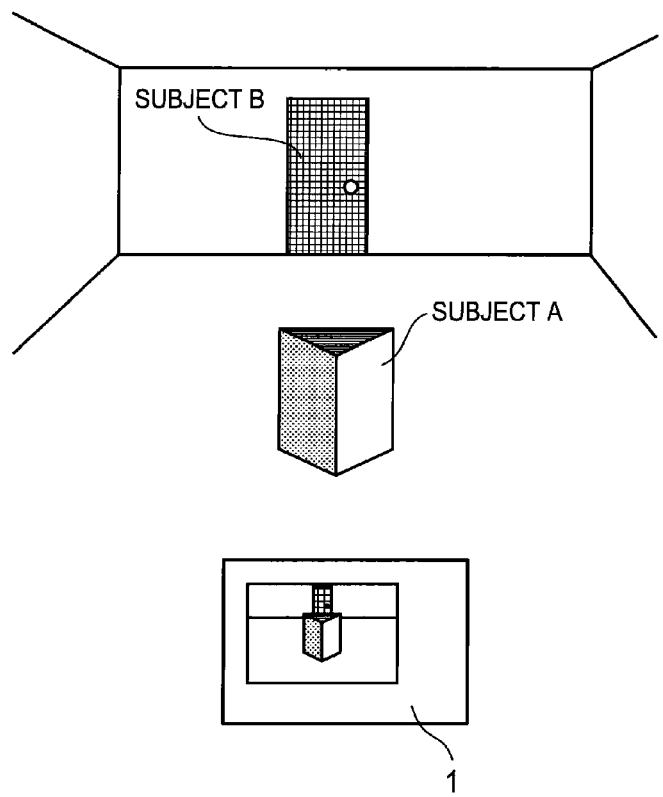
FIG. 8A illustrates an exemplary shooting scene assumed in an embodiment of the present invention.

The present embodiment herein assumes the case of using the digital camera 1 to acquire images of a scene like that shown in FIG. 8A. As shown in FIG. 8A, a subject A and a subject B are taken to be included in the angular field of view for image acquisition. In this case, the distance from the digital camera 1 to an individual subject is shorter for the subject A. In other words, a scene is assumed wherein a subject A is the active subject, while a subject B is captured as part of the background of the subject A.

Figure 8B:
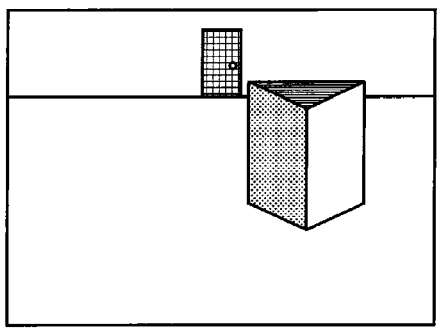
FIG. 8B illustrates a first example of an acquired image assumed in an embodiment of the present invention.
Figure 8C:
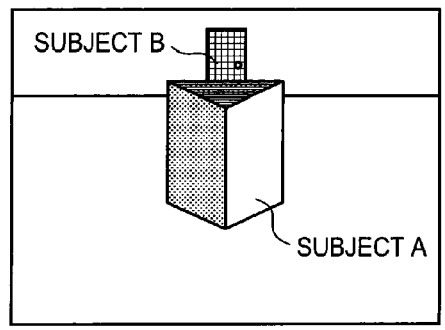
FIG. 8C illustrates a second example of an acquired image assumed in an embodiment of the present invention.

Exemplary images acquired in the case where simultaneous compound eye image acquisition is conducted for such a scene are shown in FIGS. 8B and 8C. In the present embodiment, the lens on the left when facing the subjects is taken to be included in the second image acquirer 100B, while the lens on the right when facing the subjects is taken to be included in the first image acquirer 100A. In this case, FIG. 8B illustrates an image acquired by the second image acquirer 100B, while FIG. 8C illustrates an image acquired by the first image acquirer 100A.

In the present embodiment, the image acquired by the first image acquirer 100A is to taken to be used as the final acquired image, and is hereinafter referred to as the object image 10A. Herein, the optical axes of the individual lenses are arranged so as to differ in the horizontal direction. Thus, although the same subjects in the object image 10A (i.e., the subjects A and B) are also captured in the image acquired by the second image acquirer 100B, their horizontal positions differ from those in the object image 10A. Such an image acquired by the second image acquirer 100B is referenced during template matching when computing the shooting distance on the basis of parallax, and is hereinafter referred to as the reference image 10B. In the present embodiment herein, the subject A and the subject B with differing shooting distances are taken to be overlapping each other in the object image 10A, as shown in FIG. 8C.

As a result of the image acquisition controller 212 controlling the first image acquirer 100A and the second image acquirer 100B, the object image 10A and the reference image 10B are obtained, and then each acquired image is subjected to predetermined image processing by the image processor 220 and loaded into the image memory 230. At this point, the image processor 220 notifies the feature point extractor 213 that the object image 10A and the reference image 10B have been loaded into the image memory 230, while additionally sending information specifying each image (such as file names or addresses) to the feature point extractor 213.

In response to the notification from the image processor 220, the feature point extractor 213 executes a template matching process for conducting template matching using the obtained object image 10A and reference image 10B (step S200). This template matching process will now be described with reference to the flowchart shown in FIG. 5.

Figure 9A:
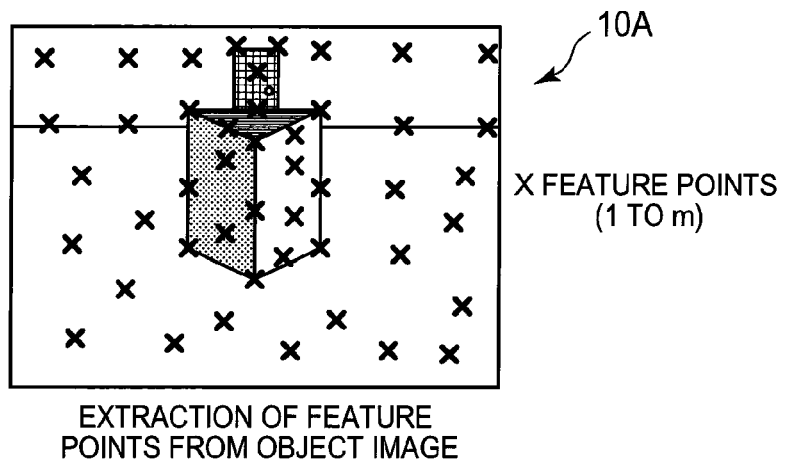
FIG. 9A illustrates exemplary feature points extracted from an acquired image in the template matching process shown in FIG. 5.

Once the process is initiated, the feature point extractor 213 extracts feature points from the object image 10A loaded into the image memory 230 (step S201). Herein, an established feature point extraction technique such as the Harris corner detection algorithm is used to extract feature points on the basis of brightness information, for example. In this case, a plurality of feature points from the object image 10A are extracted, as shown in FIG. 9A. It should be appreciated that the extracted feature points have been exaggerated in FIG. 9A for easy understanding, and that in actuality feature points are extracted in units of the pixels constituting the object image 10A.

Upon extracting a plurality of feature points in this way, the feature point extractor 213 numbers the extracted feature points by assigning each point a unique number from 1 to m (step S202).

Upon numbering the feature points, the feature point extractor 213 commands the image processor 220 to generate an edge-extracted image for the object image 10A. In response to the command from the feature point extractor 213, the image processor 220 copies the object image 10A loaded into the image memory 230, and by applying an established edge extraction technique to the copied image, generates an edge-extracted image wherein the edges in the object image 10A have been extracted (step S203). Herein, edge extraction is conducted on the basis of brightness information, using an edge extraction technique such as the Canny method, which excels in edge connectivity.

Figure 9B:
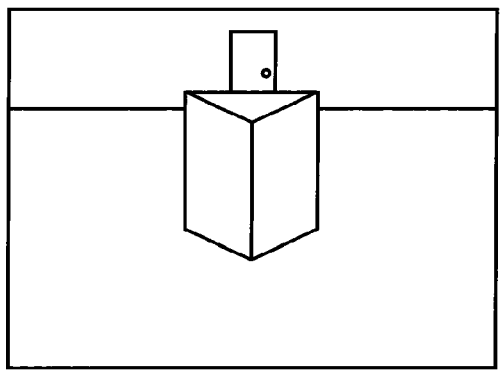
FIG. 9B illustrates an exemplary edge-extracted image in the template matching process shown in FIG. 5.

An exemplary edge-extracted image for the present case is shown in FIG. 9B. As shown in FIG. 9B, an edge-extracted image (hereinafter referred to as the edge-extracted image 11A) is generated in the form of an image wherein the contours of the subjects in the object image 10A have been highlighted. Upon generating such an edge-extracted image 11A, the image processor 220 loads the edge-extracted image 11A into the image memory 230, and notifies the feature point extractor 213.

In response to the notification from the image processor 220, the feature point extractor 213 initializes a pointer P by setting the pointer P to an initial value of 1 (step S204). The pointer P specifies one of the feature points that were numbered in step S202.

The feature point extractor 213 identifies the coordinate information of the feature point specified by the pointer P, and notifies the template setting unit 214 with the coordinate information. On the basis of the notification from the feature point extractor 213, the template setting unit 214 sets a base template BT used in template matching to the Pth feature point specified on the object image 10A (step S205).

Figure 10A:
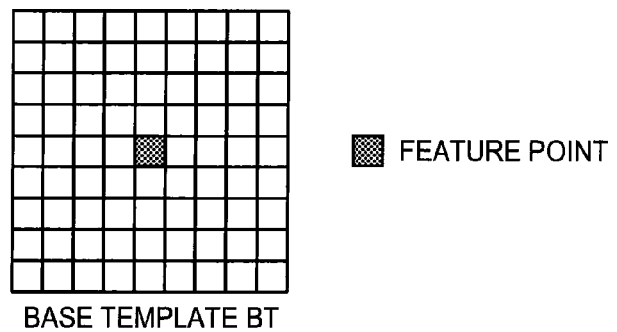
FIG. 10A illustrates an exemplary base template in the transformation matching process shown in FIG. 6.

An example of the base template BT herein is illustrated in FIG. 10A. As shown in FIG. 10A, the base template BT may be, for example, a square template made up of k×k (where k is an odd number such as 9) dots (i.e., pixels), and set such so as to be centered on the position of the specified feature point.

Upon setting the base template BT on the object image 10A, the template setting unit 214 uses the coordinate information of the base template BT as a basis for mapping the base template BT onto the edge-extracted image 11A at the same position (step S206). In this case, a feature point is also set at the position in the edge-extracted image 11A corresponding to the current feature point in the object image 10A, and thus the base template BT is also set onto the edge-extracted image 11A centered on that feature point. For this reason, a base template BT identical to the base template BT set onto the object image 10A is mapped onto the edge-extracted image 11A.

Figure 9C:
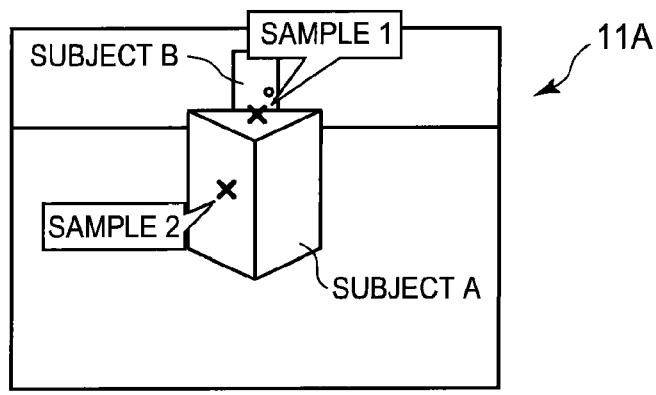
FIG. 9C illustrates exemplary feature points mapped onto an edge-extracted image in the template matching process shown in FIG. 5.

An example of the case where a feature point is set in the edge-extracted image 11A is shown in FIG. 9C. In the template matching of the present process, a template is set for each feature point extracted from the object image 10A. Herein, however, subsequent operation will be described taking the two feature points shown in FIG. 9C as samples. As shown in FIG. 9C, the sample 1 is a feature point extracted at a position where the subject A is in the vicinity of the subject B, while the sample 2 is a feature point extracted at a position in the subject A not in the vicinity of an edge.

Once the base template BT is set onto the edge-extracted image 11A at the current feature point, the template setting unit 214 determines whether or not the image area inside the base template BT has been segmented by an edge (step S207).

Figure 10B:
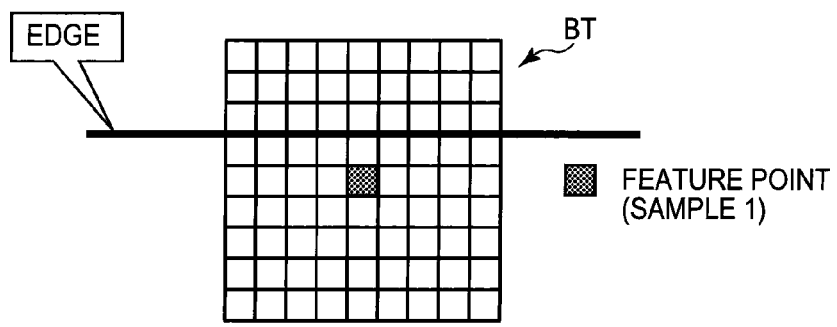
FIG. 10B illustrates an example of the case where a base template is edge-segmented in the transformation matching process shown in FIG. 6.

Herein, an edge refers to an image portion expressing the subject contours or similar lines highlighted by the edge-extracted image 11A. In the case of the base template BT set at the feature point of the above sample 1, an edge expressing a contour of the subject A is included within the base template BT, as shown in FIG. 10B.

In the present embodiment, when an edge is included within the base template BT in this way, the base template BT is taken to be segmented by that edge. As shown in FIG. 10B, if a single linear edge is included within the base template BT, then the base template BT becomes segmented into two regions. Thus, in step S207, it is determined whether or not the base template BT set on the edge-extracted image 11A has been segmented by an edge in this way.

In contrast, when the base template BT has been set at a feature point like that of the sample 2 shown in FIG. 9C, subject contours or similar lines do not exist nearby, and thus edges are not included in the base template BT. In such a case (step S207: No), the template setting unit 214 commands the distance computing unit 215 to execute template matching using the base template BT set on the object image 10A. In so doing, template matching is conducted using the base template BT (step S208).

In this case, the distance computing unit 215 scans the base template BT over the reference image 10B, whose optical axis position differs from that of the object image 10A onto which the base template BT is set. At this point, template matching using SSD or a similar method is used to search the reference image 10B for an image region similar to the pixel components within the base template BT. Herein, when template matching using SSD is conducted, a value of 0 is returned if fully matching images are found. This value increases to the extent that the discrepancy between images is large, and thus the value obtained by template matching expresses the discrepancy with the template.

By means of such a method, the position on the reference image 10B where the discrepancy is minimized becomes the position matching that of the base template BT set on the object image 10A. As described above, since the optical axis positions of the object image 10A and the reference image 10B differ in the horizontal direction, the position of the base template BT on the object image 10A and the matching position on the reference image 10B have coordinates horizontally different from each other. This difference is the parallax of the feature point, and is used to compute the shooting distance from the digital camera 1 to the subject position corresponding to that feature point (to be hereinafter described in detail).

In contrast, in the case where the base template BT set on the edge-extracted image 11A is segmented by an edge, the position of the feature point might be at a place where different subjects are shown adjoining each other. If the subjects in this case are at different distances from the digital camera 1, like the subject A and the subject B shown in FIG. 8A, then occlusion effects may be felt when template matching using a base template BT set straddling an edge like that shown in FIG. 10B. In some cases, the correct shooting distance might not be computed as a result.

A potential cause of this problem is that the pixel components of a closer subject and the pixel components of a farther subject are both included in the base template BT. Consequently, when the base template BT set on the edge-extracted image 11A is segmented by an edge, the correct distance can be computed for the feature point by conducting template matching using a template that does not straddle that edge.

Figure 6:
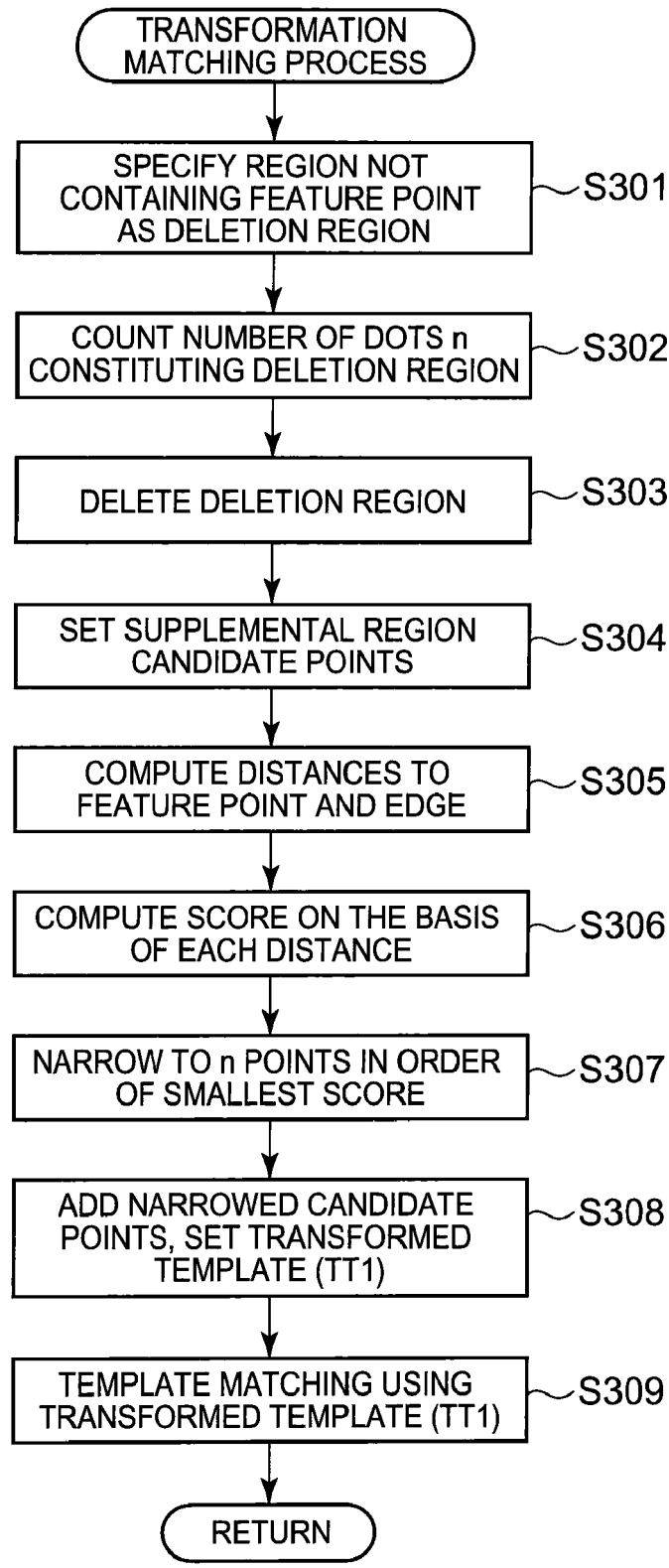
FIG. 6 is a flowchart for explaining a transformation matching process executed by the template matching process shown in FIG. 5.

Thus, in the case where the base template BT set on the edge-extracted image 11A is segmented by an edge (step S207: Yes), the template setting unit 214 executes a transformation matching process for conducting template matching using a template transformed in shape from the base template BT (step S300). This transformation matching process will now be described with reference to the flowchart shown in FIG. 6.

Figure 10C:
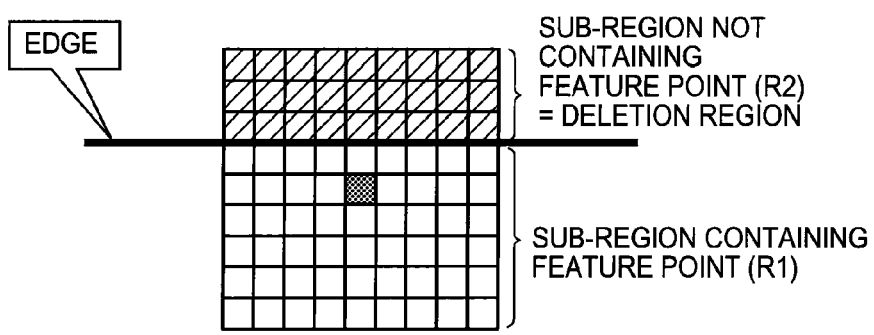
FIG. 10C illustrates an exemplary deletion region in the transformation matching process shown in FIG. 6.

Herein, as shown in FIG. 10C, the base template BT segmented by an edge is divided into two types of sub-regions: a sub-region containing the feature point (hereinafter referred to as the sub-region R1), and a sub-region not containing the feature point (hereinafter referred to as the sub-region R2). In the present process, template matching is conducted in order to compute the shooting distance for a feature point, and thus it is necessary to use the sub-region R1 containing the feature point as a template.

Thus, once the process is initiated, the template setting unit 214 specifies, from among the sub-regions of the segmented base template BT, the sub-region R2 not containing the feature point as a deletion region (step S301). The template setting unit 214 then counts the number (i.e., the dot number n) of dots (i.e., pixels) constituting the specified deletion region (step S302).

Figure 10D:
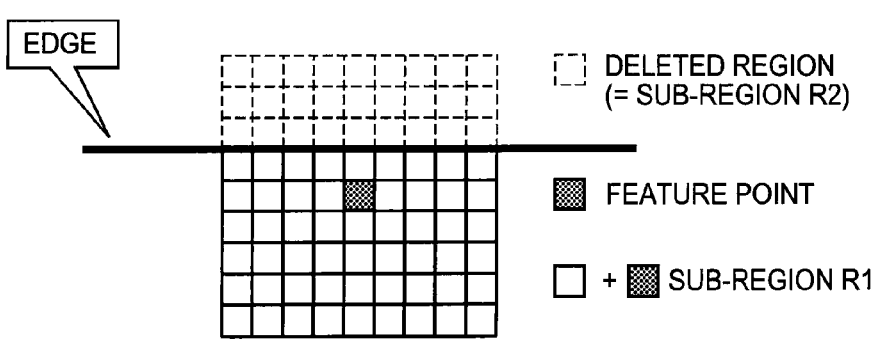
FIG. 10D illustrates an example of a deletion region having been deleted from a base template in the transformation matching process shown in FIG. 6.

Subsequently, as shown in FIG. 10D, the template setting unit 214 deletes the deletion region specified in step S301 (i.e., the sub-region R2) from the base template BT (step S303).

In so doing, the template becomes made up of just the sub-region R1 containing the feature point targeted, and its area becomes smaller than the base template BT by the amount deleted. If the template area becomes smaller (i.e., if the number of dots in the template decreases), then the processing time and load required for computing the discrepancy between images decreases, but the accuracy of the matching search is lowered. Thus, it is possible to improve accuracy in the matching search by making the template equal in area to the base template BT.

Figure 11A:
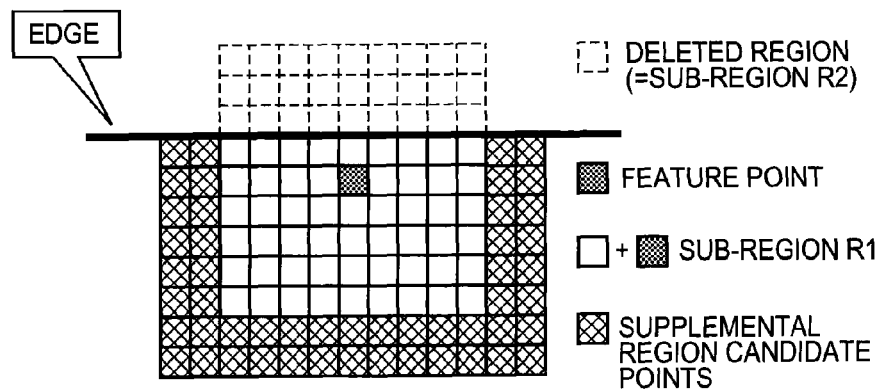
FIG. 11A illustrates exemplary supplemental region candidate points in the transformation matching process shown in FIG. 6.

In the present embodiment, a template equal in area to the base template BT is set by adding to the sub-region R1 a region equal in area to the deleted sub-region R2. In order to do so, the template setting unit 214 sets supplemental region candidate points like those shown in FIG. 11A at positions both adjoining the sub-region R1 and not crossing the edge (step S304). By way of example herein, supplemental region candidate points are set along the outer periphery of the sub-region R1, as shown in FIG. 11A. In this case, the number of supplemental region candidate points set is greater than the number of dots n constituting the deleted sub-region R2.

By narrowing supplemental region candidate points set in this way to a number equal to the number of dots n constituting the sub-region R2, a region equal in area to the deleted region is added to the sub-region R1. The narrowing at this point is conducted on the basis of the distances from each supplemental region candidate point to the feature point and the edge, for example. Thus, the template setting unit 214 computes the distance to the feature and the edge for each supplemental region candidate point that was set (step S305).

Herein, if the distance to the feature point is taken to be DA and the distance to the edge is taken to be DB, the template setting unit 214 uses an evaluation function like that shown in Eq. 1 to compute a score Q for each supplemental region candidate point on the basis of DA and DB (step S306). Herein, a in Eq. 1 is an adjustment coefficient.

$$Q = DA + \alpha \times DB \quad (\alpha < 1) \tag{Eq. 1}$$

Upon solving for a score Q for each supplemental region candidate point, the template setting unit 214 narrows the number of supplemental region candidate points to n points in order of smallest score Q (step S307). Herein, the score Q is based on the distance DA and the distance DB, and thus by narrowing in order of smallest score Q, the supplemental region candidate points are narrowed to the points closer to the feature point and the edge.

Upon narrowing the number of supplemental region candidate points to n points, the template setting unit 214 adds the narrowed supplemental region candidate points to the sub-region R1, and thereby sets a template (hereinafter referred to as the transformed template TT1) that is equal in area to the base template BT but does not cross the edge from the sub-region R1 (step S308).

Figure 11B:
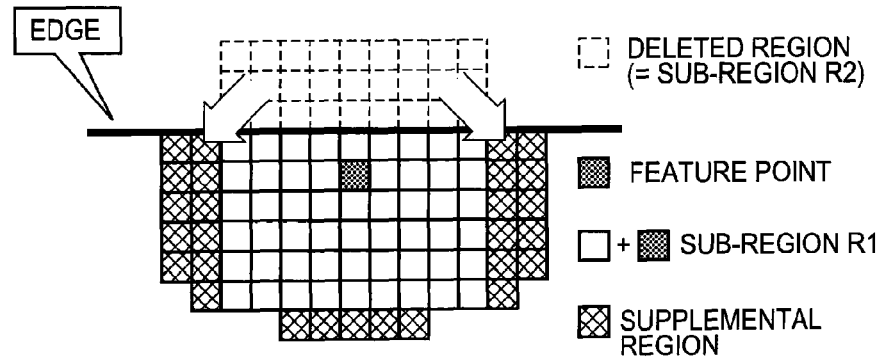
FIG. 11B illustrates an exemplary supplemental region in the transformation matching process shown in FIG. 6.
Figure 11C:
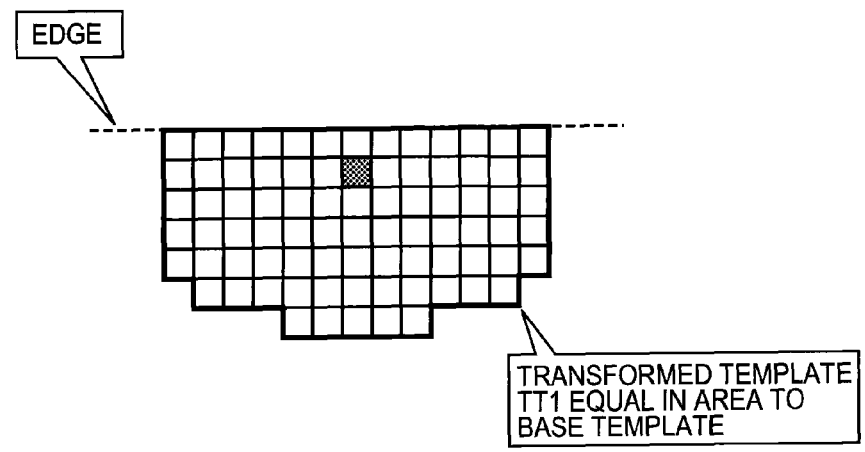
FIG. 11C illustrates an exemplary transformed template in the transformation matching process shown in FIG. 6.

In other words, as shown in FIG. 11B, by taking the supplemental region candidate points narrowed to n points to be a supplemental region, a region equal in area to the deleted sub-region R2 is added to the sub-region R1. The region made up of the sub-region R1 and the supplemental region thus becomes the transformed template TT1 as shown in FIG. 11C.

Upon setting such a transformed template TT1, the template setting unit 214 commands the distance computing unit 215 to conduct template matching using the transformed template TT1. In this case, the distance computing unit 215 conducts template matching by mapping the transformed template TT1 set by the edge-extracted image 11A onto the object image 10A, and scanning the transformed template TT1 on the object image 10A over the reference image 10B (step S309). Similarly to the template matching using the base template BT described earlier, the matching position in this case is taken to be the position where the discrepancy is minimized, based on values solved for using SSD.

Figure 5:
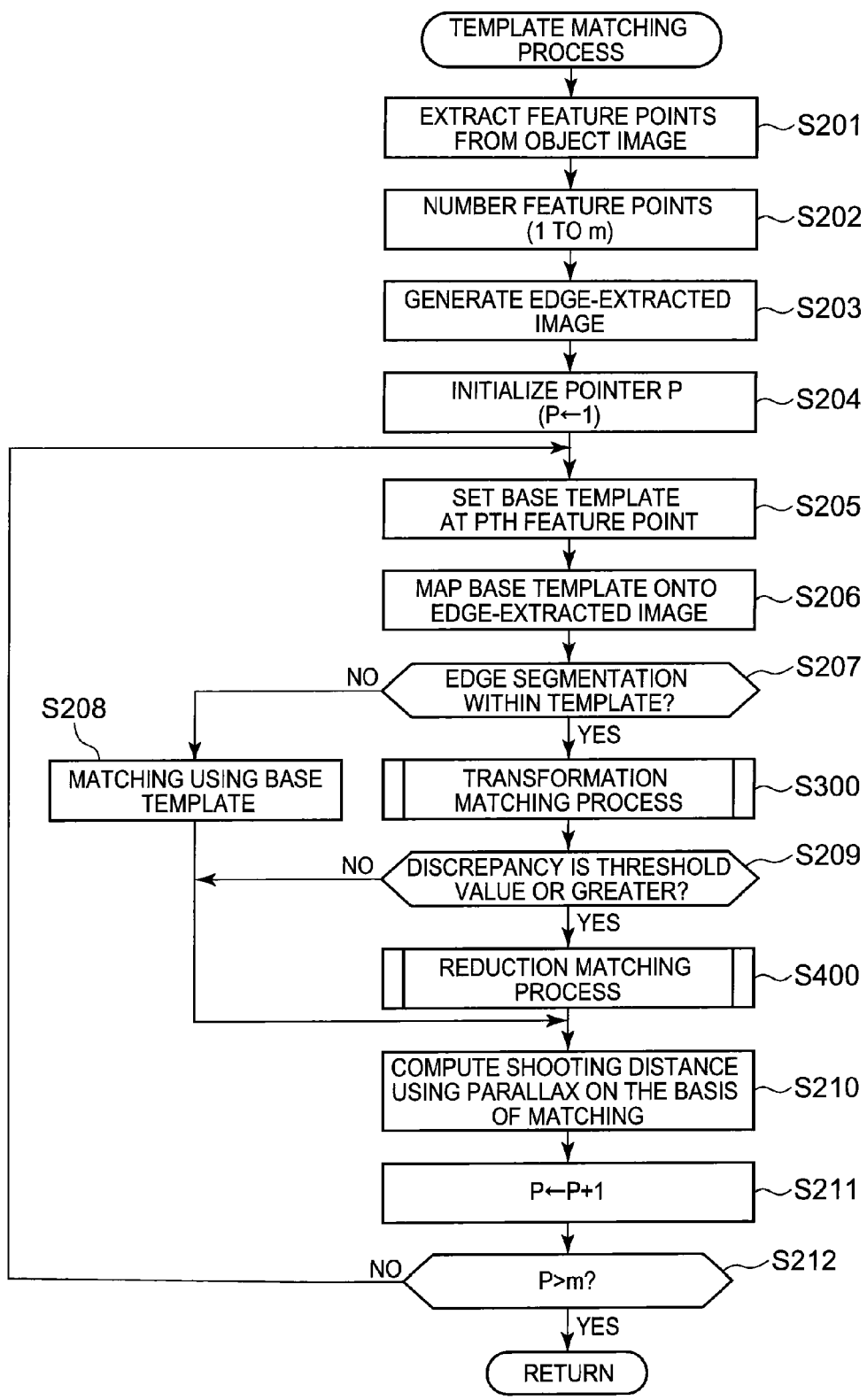
FIG. 5 is a flowchart for explaining a template matching process executed by the distance-at-shooting computing process shown in FIG. 4.

In this way, in the case where the base template BT is segmented by an edge, template matching is conducted using a transformed template TT1 equal in area to the base template BT. The process then returns to the flow in the template matching process (FIG. 5).

In the flow of the template matching process, it is then determined by the distance computing unit 215 whether or not the discrepancy in the matching conducted in step S309 of the transformation matching process is equal to or greater than a threshold value (step S209).

Figure 7:
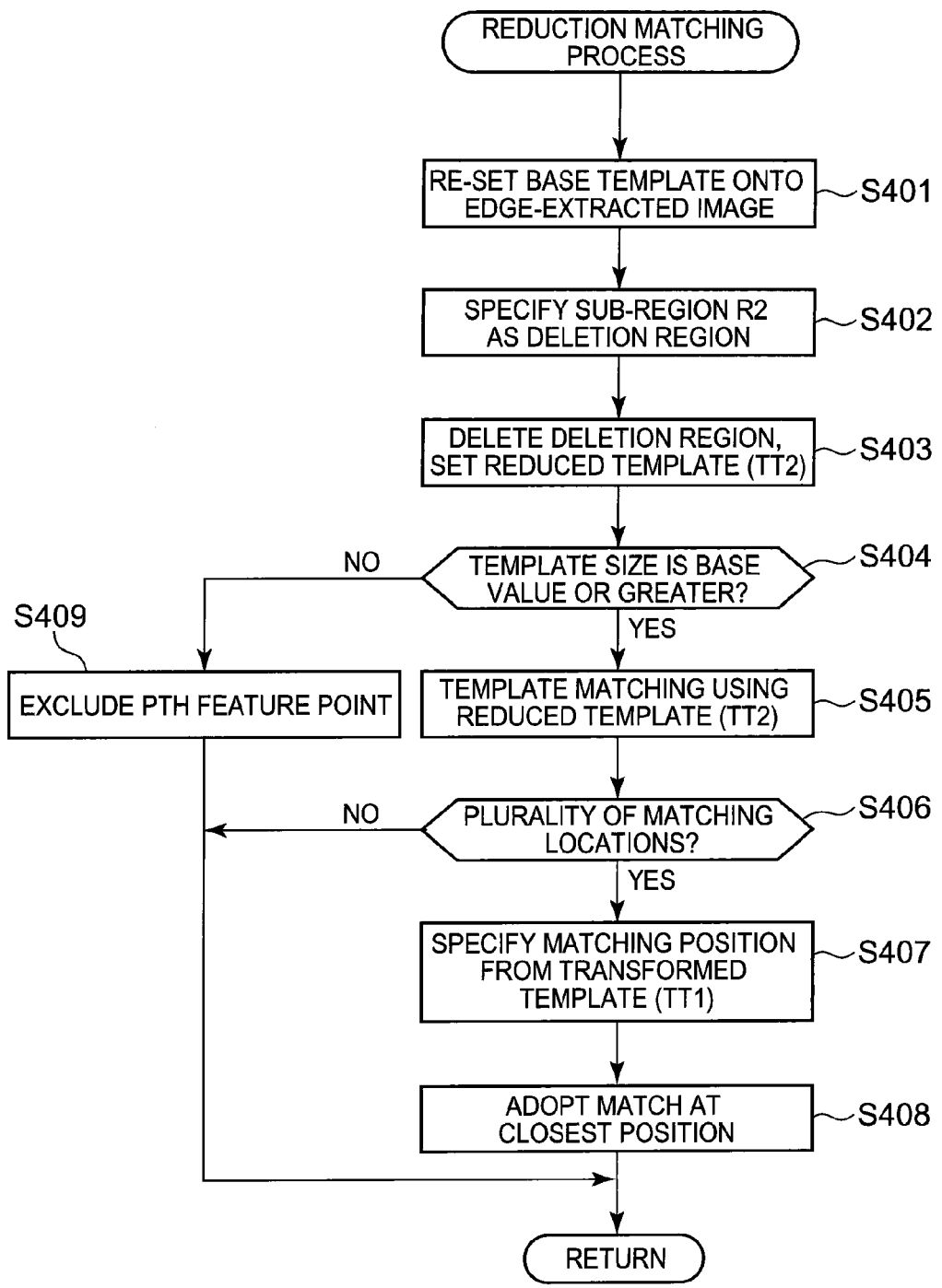
FIG. 7 is a flowchart for explaining a reduction matching process executed by the template matching process shown in FIG. 5.

Herein, if the discrepancy is high in the matching using the transformed template TT1, then the positional accuracy of the matching with the transformed template TT1 will become low, and thus it is desirable to conducting template matching with higher positional accuracy. Consequently, in the case where the discrepancy is equal to or greater than a threshold value (step S209: Yes), the distance computing unit 215 notifies the template setting unit 214 with this information. In this case, the template setting unit 214 executes a reduction matching process for conducting template matching using a template that is smaller than the base template BT (step S400). This reduction matching process will now be described with reference to the flowchart shown in FIG. 7.

Figure 12A:
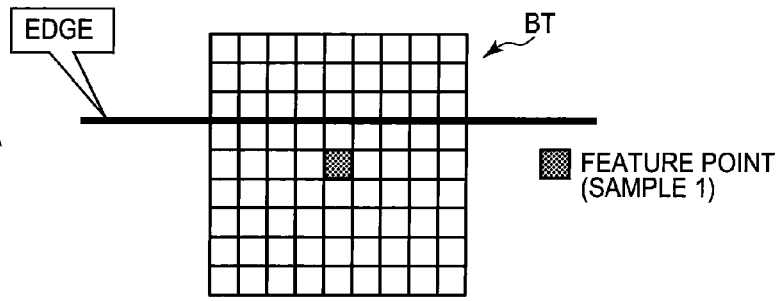
FIG. 12A illustrates an exemplary base template in the reduction matching process shown in FIG. 7.

Once the process is initiated, the template setting unit 214 re-sets the base template BT to the currently targeted feature point on the edge-extracted image 11A (step S401). In other words, a base template BT centered on the feature point as shown in FIG. 12A is set on the edge-extracted image 11A.

Figure 12B:
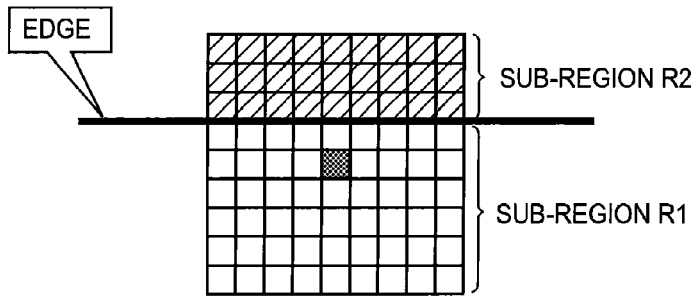
FIG. 12B illustrates an exemplary deletion region in the reduction matching process shown in FIG. 7.
Figure 12C:
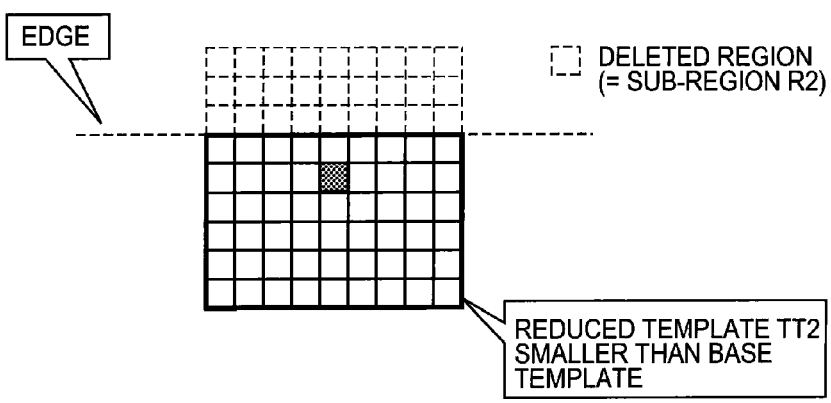
FIG. 12C illustrates an exemplary reduced template in the reduction matching process shown in FIG. 7.

Herein, if the current feature point is the sample 1 shown in FIG. 9C, the base template BT becomes segmented by an edge, as shown in FIG. 12B. For this reason, the template setting unit 214 specifies the sub-region R2 as a deletion region (step S402), and deletes the deletion region from the base template BT. In so doing, the template setting unit 214 sets a template smaller in area than the base template BT (hereinafter referred to as the reduced template TT2), as shown in FIG. 12C (step S403).

Upon setting the reduced template TT2, the template setting unit 214 determines whether or not the size of the reduced template TT2 is equal to or greater than a base value indicating the size of a predetermined base (step S404). Herein, decreasing the template size increases the likelihood of matching at other matching positions similar to the feature point, but on the other hand, by decreasing the template size it becomes possible to match at a matching position corresponding to a feature point near the subject boundary. Since the positional accuracy was low when matching using the above transformed template TT1, the present process reduces the template size in order to increase the positional accuracy. However, if the template size is excessively small, the template might match at other matching positions similar to the feature point. Consequently, in the present process, only a reduced template TT2 with at least a prescribed size is used.

In the case where the size of the reduced template TT2 that has been set is equal to or greater than the base value (step S404: Yes), the template setting unit 214 commands the distance computing unit 215 to execute template matching using the reduced template TT2. In this case, the distance computing unit 215 conducts template matching by scanning a template over the reference image 10B, the template in this case being the reduced template TT2 set in the edge-extracted image 11A and mapped onto the object image 10A (step S405). At this point, the distance computing unit 215 uses the reduced template TT2 to conduct a search around the position matched by the transformation matching process (FIG. 6) conducted earlier.

Herein, since the reduced template TT2 is smaller in size than the base template BT, there is a possibility that the search will yield matches at a plurality of locations. In other words, there is a high probability that a plurality of locations with low discrepancy (i.e., matching peaks) exists. In the case where matches are yielded at a plurality of locations in this way (step S406: Yes), the distance computing unit 215 specifies the position that yielded a match in the template matching using the transformed template TT1 conducted immediately prior, even if the discrepancy is high (step S407). Subsequently, from among the plurality of matches, the distance computing unit 215 adopts the match at the position closest to the specified position (step S408).

In this way, in the case where the discrepancy is equal to or greater than a threshold value in the matching using the transformed template TT1, template matching is conducted using a reduced template TT2 smaller in size than the base template BT. The process then returns to the flow in the template matching process (FIG. 5).

However, in the case where the size of the reduced template TT2 that has been set does not meet the base value (step S404: No), the template setting unit 214 does not command the distance computing unit 215 to execute template matching using the reduced template TT2, and instead excludes the Pth feature point currently being processed (step S409). The process then returns to the flow in the template matching process (FIG. 5). The above is done because the accuracy of the matching search will be decreased if matching is conducted using a template that does not meet the necessary size, and thus the accuracy of the shooting distance computation will be insufficient.

As described above, in the template matching process, matching operations are conducted using one of three types of templates depending on the circumstances. In other words, if the base template BT that has been set is not segmented by an edge, then template matching is conducted using the base template BT. In the case where the base template BT is segmented by an edge, template matching is conducted using the transformed template TT1. In the case where the discrepancy in the template matching using the transformed template TT1 is equal to or greater than a threshold value, template matching is conducted using the reduced template TT2.

Once template matching is conducted for the Pth feature point by one of the above methods, the distance computing unit 215 uses the matching result as a basis for computing the shooting distance for the feature point (step S210). The distance computation in this case is conducted using the triangulation principle. An example of distance computation using the triangulation principle will now be described with reference to FIGS. 13 and 14.

Figure 13:
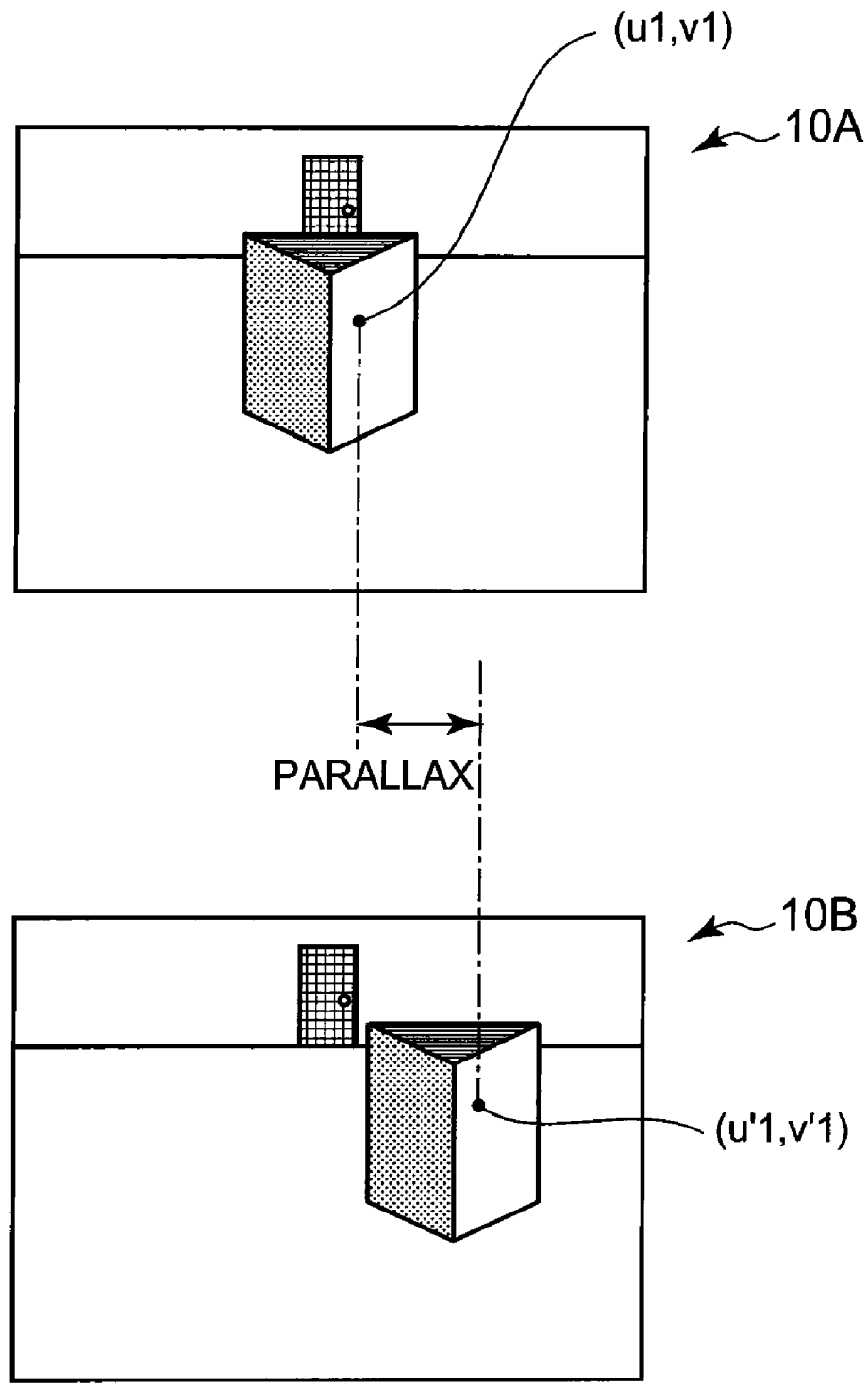
FIG. 13 is a diagram for explaining the principle of triangulation.

FIG. 13 illustrates examples of an object image 10A and a reference image 10B when template matching is conducted. In FIG. 13, template matching for the feature point (u1, v1) on the object image 10A is shown to yield the matching position (u'1, v'1) on the reference image 10B. The digital camera 1 in accordance with the present embodiment is a parallel stereo camera wherein the optical axes of the first image acquirer 100A and the second image acquirer 100B differ in the horizontal direction. For this reason, parallax occurs in the matching position between the object image 10A and the reference image 10B.

Herein, if the actual position corresponding to the matching feature point yielded by template matching is A1 (X1, Y1, Z1) in the camera coordinates shown in FIG. 2B, then each coordinate (X1, Y1, Z1) in A1 is expressed by the following Eqs. 2 to 4. As described earlier, (u1, v1) indicates the projective point to the image coordinate plane (i.e., the object image) for the first image acquirer 100A, while (u'1, v'1) indicates the projective point to the image coordinate plane (i.e., the reference image) of the second image acquirer 100B. In addition, b indicates the distance between the optical axes (i.e., the distance between the base lines) of the first image acquirer 100A and the second image acquirer 100B.

$$X1 = (b \times (u1))/((u'1) - u1) \quad \text{(Eq. 2)}$$

$$Y1 = (b \times (v1))/((u'1) - u1) \quad \text{(Eq. 3)}$$

$$Z1 = (b \times f)/((u'1) - u1) \quad \text{(Eq. 4)}$$

Herein, the distance from the digital camera 1 to A1 is indicated by the coordinate Z1 of A1. Thus, by evaluating the above Eq. 4, the distance computing unit 215 is able to compute the distance from the actual position corresponding to the feature point to the digital camera 1, or in other words, the shooting distance.

This Eq. 4 is derived by means of the triangulation principle. The triangulation principle will now be described with reference to FIG. 14.

Figure 14:
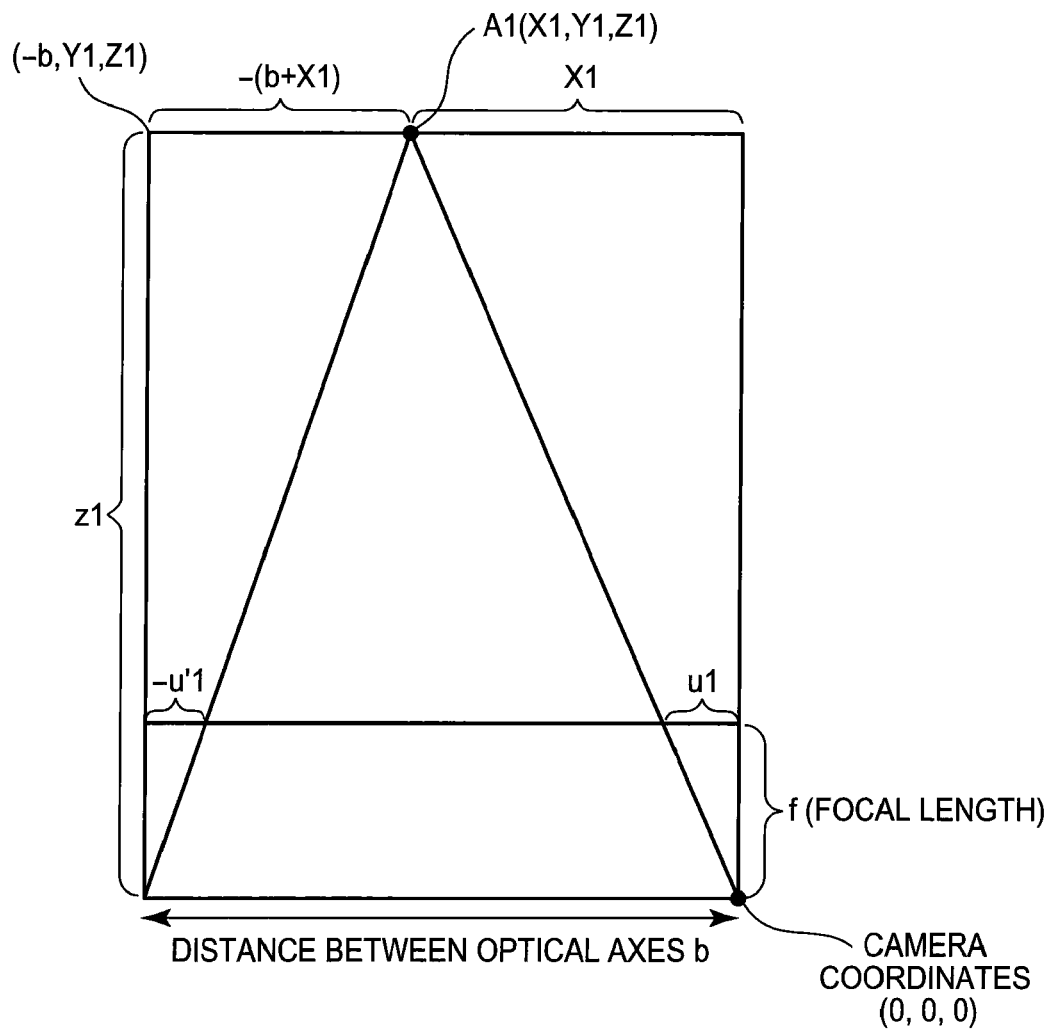
FIG. 14 is a diagram for explaining the principle of triangulation.

FIG. 14 is a schematic diagram showing camera coordinates in the parallel stereo configuration shown in FIG. 2B as seen from above. Since the camera coordinates are defined from the point of view of the first image acquirer 100A, X1 in the camera coordinates is assigned to the coordinate of the subject position A1 in the X axis direction, and its value can be computed using the equation (1) shown in FIG. 14.

Meanwhile, the coordinate of A1 in the X axis direction from the point of view of the second image acquirer 100B is the sum of the distance b between the optical axes and X1 in the camera coordinates, which can be computed using the equation (2) shown in FIG. 14. From these equations (1) and (2), the above Eq. 4 is derived.

In this way, upon computing the shooting distance for the Pth feature point, the distance computing unit 215 specifies the next feature point by incrementing the pointer P by +1 (step S211 in the flow shown in FIG. 5). Herein, if the next feature point exists (step S212: No), the processing in step S205 and thereafter is conducted for that feature point.

However, in the reduction matching process (FIG. 7), if the feature point has been excluded because the size of the reduced template TT2 does not meet the base value (step S404: No, step S409), then the next feature point is specified without conducting the distance computation in step S210 (step S211).

Figure 4:
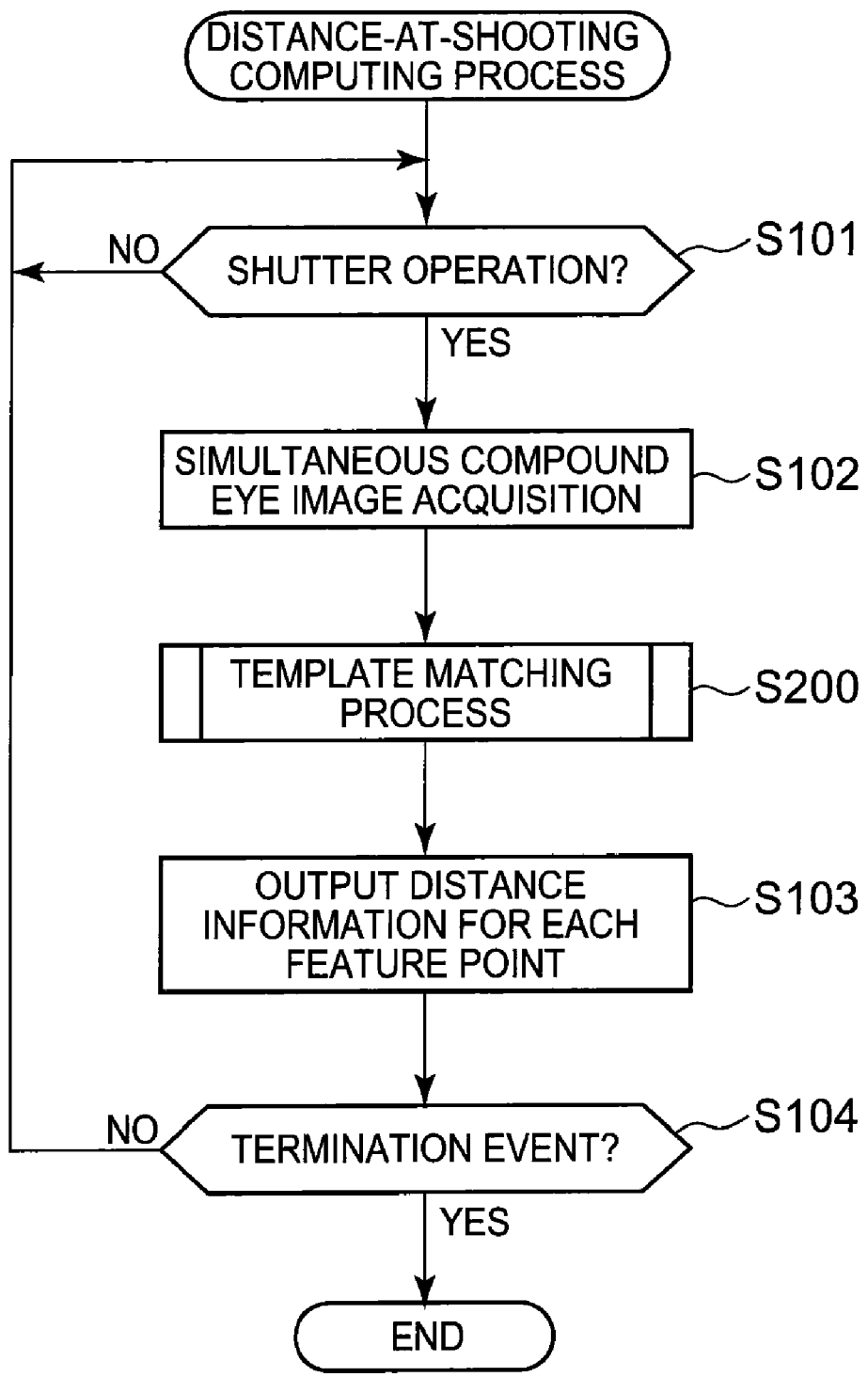
FIG. 4 is a flowchart for explaining a distance-at-shooting computing process in accordance with an embodiment of the present invention.

Later, once the computation of shooting distance has been conducted for each feature point by conducting the respective processes described above in order, and all feature points have been processed (step S212: Yes), the process returns to the flow in the distance-at-shooting computing process (FIG. 4).

In the distance-at-shooting computing process, the distance computing unit 215 generates and outputs distance information indicating the shooting distance for each feature point that was computed in the template matching process (step S103).

Besides being output to the display 310 for display, the output at this point may be saved by being output to the storage unit 250 or the external storage unit 260 together with the acquired image (i.e., the object image 10A), or alternatively, output to an external apparatus via the external interface 320, for example. The selection of such output methods may be conducted as a result of the user operating the user-operable unit 330, for example. The output signal to the display 310 and the input signal from the user-operable unit 330 related to such a selection operation are input into the distance computing unit 215 via the operational mode processor 211.

Herein, the external apparatus connected via the external I/F 320 may be, for example, an image processing apparatus that conducts 3D modeling on the basis of distance information. In other words, in cases such as when generating 3D computer graphics on the basis of images of real-life objects, 3D modeling can be conducted by inputting an acquired image and distance information for each feature point from the digital camera 1 in accordance with the present embodiment.

Once the output of the distance information is completed in the digital camera 1, the respective processes described above are conducted until a predetermined termination event (such as canceling the distance computing mode or powering off the digital camera 1) occurs (step S104: No). The process is terminated by the occurrence of an termination event (step S104: Yes).

As described in the foregoing, by applying an embodiment of the present invention, distance computation can be conducted with higher accuracy.

In the present case, when an edge is detected within the ordinary template (i.e., the base template), a transformed template is used that is equal in size to the base template, but does not cross the edge. Consequently, the template size is not reduced, even when conducting template matching near the subject boundary. In so doing, more accurate distance computation can be conducted, even for images with occlusion.

Herein, by setting the base template onto an edge-extracted image containing the edges extracted from one of the images, it can be easily determined whether or not a site for template matching is a subject boundary portion. In so doing, template transformation can be conducted just for the subject boundary portions, thereby making it possible to improve distance computation accuracy without excessively increasing the processing load.

In addition, when transforming the template, the template can be made more accurate near the feature point by adding regions closer to both the feature point and the edge.

Herein, template matching using a template reduced in size is conducted just for the case where the discrepancy in the matching with the transformed template is equal to or greater than a threshold value. For this reason, template size reduction, which decreases distance computation accuracy, can be kept to a minimum.

In addition, since template matching using the reduced template is conducted near the position yielded by matching with the transformed template, the increased search time that occurs as a result of making the template size smaller can be suppressed.

In template matching using a small-size template, a plurality of matching peaks might appear. In such cases, the matching closest to the matching position of the transformed template is adopted, thereby enabling more accurate matching to be efficiently conducted.

Furthermore, by comparison with a predetermined base value, it can be determined whether or not the size of the reduced template that has been set is too small to guarantee the required distance computational accuracy, for example. If it is determined that the size does not meet the base value, then the targeted feature point for matching is excluded, thereby enabling a fixed standard of distance computational accuracy to be secured.

In addition, by applying the technique of the present invention to a compound eye camera with a parallel stereo configuration, for example, distance computation with high accuracy can be conducted at the time of shooting (i.e., image acquisition).

The foregoing embodiment is merely an example, and the scope of application of the present invention is not limited thereto. In other words, a variety of applications are possible, and any such embodiments are to be included within the scope of the present invention.

For example, in the foregoing embodiment, it is determined whether or not the base template BT is internally segmented by an edge by generating an edge-extracted image containing the edges extracted from an acquired image. However, if it can be determined that a given image portion is a subject boundary, then the determination method is not limited to the above, and may be arbitrary. For example, segmentation using the mean shift method may be conducted, and the subject boundaries may then be determined from the segment boundaries.

In addition, in the case where the present invention is realized using an image acquisition apparatus like the digital camera 1 given by way of example in the foregoing embodiment, the apparatus may be provided as an image acquisition apparatus having the configuration and functions related to the present invention already built-in. Alternatively, a known image acquisition apparatus may be made to function as an image acquisition apparatus in accordance with the present invention by applying a program that realizes functions similar to the respective functions of the controller 210. In this case, although it is desirable for the image acquisition apparatus to have a parallel stereo configuration, images of the same subject but with differing optical axis positions can still be acquired with an image acquisition apparatus having singular image acquiring unit. If such images are acquired, distance computation by means of template matching can be conducted by application of the present invention.

For example, although the foregoing embodiment describes by way of example the case where the present invention is realized as a parallel stereo image acquisition apparatus, the image processing apparatus of the present invention may also be realized as an apparatus lacking image acquisition functions (such as a personal computer, for example).

In other words, although the foregoing embodiment describes by way of example the case of applying the present invention to a compound eye camera having a parallel stereo configuration, the present invention may be applied to apparatus other than image acquisition apparatus, as long as such apparatus is capable of obtaining a plurality of parallax images of the same subject.

For example, the present invention may also be applied to an apparatus that conducts 3D modeling. In other words, by realizing a functional configuration like that shown in FIG. 3 with such an apparatus, the apparatus may accept as input two acquired images with differing optical axis directions that have been obtained by a parallel stereo camera like the digital camera 1 in accordance with the present embodiment. By subsequently processing the input images similarly to the respective processes described earlier, the shooting distance for each feature point may be computed in the apparatus and used for 3D modeling.

In this case, by adapting a program, a known apparatus may be likewise made to function as an image processing apparatus in accordance with the present invention.

The method of applying such a program is arbitrary. For example, the program may be stored on a recording medium, such as a CD-ROM (Compact Disc Read-Only Memory), a DVD (Digital Versatile Disc), an MO (Magneto-Optical Disk), or a memory card. Alternatively, the program may be applied via a communication medium such as the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image processing apparatus that conducts template matching among a plurality of images, the apparatus comprising:
   an image acquiring unit for acquiring two or more parallax images of a same subject;
   a feature point setting unit for setting feature points in one of the images acquired by the image acquiring unit;
   a template setting unit for setting a base template that includes a feature point set by the feature point setting unit;
   an image determining unit for determining whether or not an image within the base template set by the template setting unit is segmented by an edge;
   a transformed template setting unit for setting a transformed template in a case in which it is determined that the image within the base template is segmented, wherein a segmented sub-region that does not contain the feature point is deleted from the base template, and a region equal in area to the deleted region is added to a sub-region that does contain the feature point, wherein the added region is entirely within a feature point side of the edge;
   a matching unit for conducting the template matching with respect to the one or more other images, using at least the base template or the transformed template; and
   a distance computing unit for computing a shooting distance to the feature point matched by the template matching conducted by the matching unit.

2. The image processing apparatus according to claim 1, further comprising:
   an edge-extracted image generating unit for generating an edge-extracted image containing the edge extracted from the image.

3. The image processing apparatus according to claim 1, wherein the transformed template setting unit determines the region to be added based on a distance to the edge and a distance to the feature point.

4. The image processing apparatus according to claim 1, wherein the transformed template setting unit further comprises a reduced template setting unit for setting, in a case in which a discrepancy in a matching using the transformed template is equal to or greater than a threshold value, a reduced template wherein a segmented sub-region that does not contain the feature point is deleted from the base template, and wherein the matching unit conducts the template matching using the reduced template based on a position matched by the template matching using the transformed template.

5. The image processing apparatus according to claim 4, wherein the matching unit, in a case in which the template matching using the reduced template yields a plurality of matches, adopts the match at a position closest to the position that was matched by the transformed template.

6. The image processing apparatus according to claim 4, wherein the matching unit, in a case where in which a size of the reduced template is equal to or less than a base value, excludes the current feature point from a target of processing.

7. The image processing apparatus according to claim 1, wherein the image acquiring unit is provided with two or more acquiring units with differing optical axis positions.

8. The image processing apparatus according to claim 7, wherein the two or more acquiring units constitute a parallel stereo configuration.

9. An image matching method for conducting a template matching among a plurality of images in an image processing apparatus, the method comprising:

(a) acquiring two or more parallax images of a same subject;
(b) setting feature points in one of the images acquired in step (a);
(c) setting a base template that includes a feature point set in step (b);
(d) determining whether or not an image within the base template set in step (c) is segmented by an edge;
(e) setting a transformed template in a case in which it is determined that the image within the base template is segmented, wherein a segmented sub-region that does not contain the feature point is deleted from the base template, and a region equal in area to the deleted region is added to a sub-region that does contain the feature point, wherein the added region is entirely within a feature point side of the edge;
(f) matching by conducting the template matching with respect to the one or more other images, using at least the base template or the transformed template; and
(g) computing a shooting distance to the feature point matched by the template matching conducted in step (f).

10. The image matching method according to claim 9, further comprising:

(h) generating an edge-extracted image containing the edge extracted from the image.

11. The image matching method according to claim 9, wherein in step (e), the region to be added is determined based on a distance to the edge and a distance to the feature point.

12. The image matching method according to claim 9, wherein the transformed template setting step further comprises:

(i) setting a reduced template in a case in which a discrepancy in a matching using the transformed template conducted in step (e) is equal to or greater than a threshold value, wherein a segmented sub-region that does not contain the feature point is deleted from the base template; and wherein in step (f), the template matching is conducted using the reduced template based on a position matched by the template matching using the transformed template.

13. The image matching method according to claim 12, wherein the match adopted, in a case in which the template matching using the reduced template yields a plurality of matches in step (f), is the match at a position closest to the position that was matched by the transformed template.

14. The image matching method according to claim 12, wherein the current feature point, in a case in which a size of the reduced template is equal to or less than a base value in step (f), is excluded from a target of processing.

15. A non-transitory computer-readable recording medium having a program stored thereon which is executable by a computer that controls an image processing apparatus that conducts template matching among a plurality of images, the program causing the computer to function as units comprising:

an image acquiring unit that acquires two or more parallax images of a same subject;
a feature point setting unit that sets feature points in one of the acquired images;
a template setting unit that sets a base template that includes a set feature point;
an image determining unit that determines whether or not an image within the set base template is segmented by an edge;
a transformed template setting unit that sets a transformed template in a case in which it is determined that the image within the base template is segmented, wherein a segmented sub-region that does not contain the feature point is deleted from the base template, and a region equal in area to the deleted region is added to a sub-region that does contain the feature point, wherein the added region is entirely within a feature point side of the edge;
a matching unit that conducts the template matching with respect to the one or more other images, using at least the base template or the transformed template; and
a distance computing unit that computes a shooting distance to the feature point matched by the template matching.

16. The non-transitory computer-readable recording medium according to claim 15, wherein the program controls the computer to further function as:

an edge-extracted image generating unit that generates an edge-extracted image containing the edge extracted from the image.

17. The non-transitory computer-readable recording medium according to claim 15, wherein the transformed template setting unit determines the region to be added based on a distance to the edge and a distance to the feature point.

18. The non-transitory computer-readable recording medium according to claim 15, wherein the transformed template setting unit further comprises a reduced template setting unit that sets, in a case in which a discrepancy in a matching using the transformed template is equal to or greater than a threshold value, a reduced template wherein a segmented sub-region that does not contain the feature point is deleted from the base template, and wherein the matching unit conducts the template matching using the reduced template based on a position matched by the template matching using the transformed template.

19. The non-transitory computer-readable recording medium according to claim 18, wherein the matching unit, in a case in which the template matching using the reduced template yields a plurality of matches, adopts the match at a position closest to the position that was matched by the transformed template.

20. The non-transitory computer-readable recording medium according to claim 18, wherein the matching unit, in a case in which a size of the reduced template is equal to or less than a base value, excludes the current feature point from a target of processing.

* * * * *

UNITED STATES PATENT AND TRADEMARK OFFICE
CERTIFICATE OF CORRECTION

PATENT NO. : 8,224,069 B2
APPLICATION NO. : 12/685102
DATED : July 17, 2012
INVENTOR(S) : Mitsuyasu Nakajima Page 1 of 1

It is certified that error appears in the above-identified patent and that said Letters Patent is hereby corrected as shown below:

Column 19, Line 19; Claim 6, Line 2:

After "case" delete "where".

Signed and Sealed this
Twenty-seventh Day of November, 2012

David J. Kappos
*Director of the United States Patent and Trademark Office*